US010769111B2

(12) United States Patent
Bailey et al.

(10) Patent No.: US 10,769,111 B2
(45) Date of Patent: Sep. 8, 2020

(54) DATA TRANSFORMATION OF CASSANDRA FILES FOR IMPROVED DEDUPLICATION DURING BACKUP

(71) Applicant: EMC IP Holding Company LLC, Hopkinton, MA (US)

(72) Inventors: Charles Christopher Bailey, Cary, NC (US); Donna Barry Lewis, Holly Springs, NC (US); Jeffrey Ford, Cary, NC (US); Frederick Douglis, Basking Ridge, NJ (US)

(73) Assignee: EMC Holding Company, LLC, Hopkinton, MA (US)

( * ) Notice: Subject to any disclaimer, the term of this patent is extended or adjusted under 35 U.S.C. 154(b) by 171 days.

(21) Appl. No.: 15/961,794

(22) Filed: Apr. 24, 2018

(65) Prior Publication Data

US 2019/0325041 A1 Oct. 24, 2019

(51) Int. Cl.
*G06F 17/00* (2019.01)
*G06F 16/174* (2019.01)
*G06F 3/06* (2006.01)
*G06F 11/14* (2006.01)
*G06F 16/215* (2019.01)
*G06F 16/25* (2019.01)
*G06F 16/22* (2019.01)
*G06F 40/14* (2020.01)
*G06F 40/205* (2020.01)

(52) U.S. Cl.
CPC ........ *G06F 16/1748* (2019.01); *G06F 3/0608* (2013.01); *G06F 11/1453* (2013.01); *G06F 16/215* (2019.01); *G06F 16/2282* (2019.01); *G06F 16/258* (2019.01); *G06F 40/14* (2020.01); *G06F 40/205* (2020.01)

(58) Field of Classification Search
CPC ...... G06F 3/0608; G06F 3/067; G06F 3/0673; G06F 12/0246; G06F 12/0868; G06F 12/0871
See application file for complete search history.

(56) References Cited

U.S. PATENT DOCUMENTS 8,234,468 B1* 7/2012 Deshmukh .......... G06F 16/1748
711/162

* cited by examiner

*Primary Examiner* — Truong V Vo
(74) *Attorney, Agent, or Firm* — Barry N. Young

(57) ABSTRACT

Cassandra SSTable data is transformed to provide data rows that are a consistent size such that data in each row has a length that is contained within a selected fixed sized kilobyte segment for deduplication. Tables of a Cassandra cluster node are translated in parallel to JSON format using Cassandra SSTableDump and the table rows are parsed to provide data rows corresponding to the data in each table row. Each row of data is padded with a predictable pattern of bits such that the data row has a length corresponding to the selected fixed segment size and has boundary locations that correspond to multiple of the selected segment size. Since each row of data starts on a segment boundary, duplicate rows of data will be identified wherever they move within a table.

14 Claims, 5 Drawing Sheets

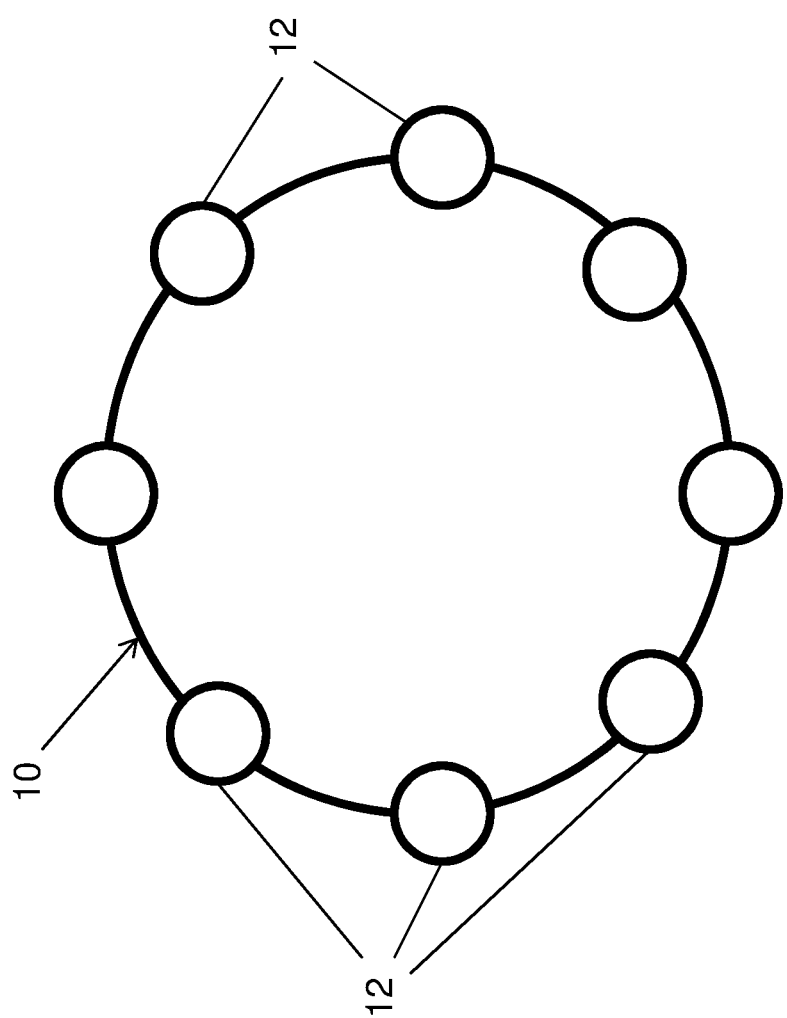

| Start Offset | Length | Row Key |
|---|---|---|
| 0 | 1024 | 17 |
| 1024 | 512 | 100 |
| 1536 | 512 | 412 |
| 2048 | 512 | 1021 |
| 2560 | 256 | 2001 |
| 2816 | 2048 | 2004 |
| 4864 | 1024 | 2700 |
| 5888 | 2048 | 3209 |
| 7936 | 256 | 8000 |
| 8192 | | |

Figure 2A

| Start Offset | Length | Row Key |
|---|---|---|
| 0 | 1024 | 17 |
| 1024 | 256 | 75 |
| 1280 | 512 | 100 |
| 1792 | 512 | 412 |
| 2304 | 256 | 789 |
| 2560 | 512 | 1021 |
| 3072 | 256 | 789 |
| 3328 | 2048 | 2004 |
| 5376 | 256 | 2107 |
| 5632 | 1024 | 2700 |
| 6656 | 2048 | 3209 |
| 8704 | 256 | 4099 |
| 8960 | 256 | 8000 |
| 9216 | | |

Figure 2B

| Start Offset | Length | Row Key | Fingerprint |
|---|---|---|---|
| 0 | 1024 | 17 | 123 |
|  | 3072 | Padding |  |
| 4096 | 256 | 75 | 013 |
|  | 3840 | Padding |  |
| 8192 | 512 | 100 | 234 |
|  | 3584 | Padding |  |
| 12288 | 512 | 412 | 345 |
|  | 3584 | Padding |  |
| 16384 | 256 | 789 | 135 |
|  | 3840 | Padding |  |
| 20480 | 512 | 1021 | 456 |
|  | 3584 | Padding |  |
| 24576 | 256 | 2001 | 567 |
|  | 3840 | Padding |  |
| 28672 | 2048 | 2004 | 678 |
|  | 2048 | Padding |  |

40 →

| 32768 | 256 | 2107 | 246 |
|---|---|---|---|
|  | 3840 | Padding |  |
| 36864 | 1024 | 2700 | 789 |
|  | 3072 | Padding |  |
| 40960 | 2048 | 3209 | 890 |
|  | 2048 | Padding |  |
| 45056 | 256 | 4099 | 357 |
|  | 3840 | Padding |  |
| 49152 | 256 | 8000 | 901 |
|  | 3840 | Padding |  |
| 53248 |  |  |  |

Figure 4

DATA TRANSFORMATION OF CASSANDRA FILES FOR IMPROVED DEDUPLICATION DURING BACKUP

BACKGROUND

This invention relates generally to data deduplication for data storage and network transfers, and more particularly to techniques for transforming data that has been moved and intermingled so that the data that is the same can be identified and deduplicated.

Data deduplication ("DD") is a data compression technique for eliminating duplicate copies of repeating data to improve storage utilization and to reduce the number of bytes that must be transmitted over a network. Data deduplication is particularly important in enterprises having big data networks because of the massive amounts of data which must be transmitted over the network, stored and backed up. Deduplication is typically performed in connection with a backup. In the deduplication process, chunks of data, or byte patterns, are identified by a fingerprint such as a hash that is unique to each chunk of data and the fingerprints and chunks are stored. As the process continues, the fingerprints of other chunks are compared to the stored fingerprints and whenever a match occurs, the redundant chunk may be replaced with a small reference or pointer to the stored chunk. Since the same byte pattern may occur frequently, the amount of data that must be stored or transferred may be greatly reduced.

There are certain data layouts that do not deduplicate very well because the files are constantly changing and being rearranged, making it difficult to identify redundant data. Cassandra data files are an example of such files where deduplication problems occur because the data in the files are constantly being merged and rearranged, and because redundant copies of the same data are replicated with different layouts on different nodes of a Cassandra cluster. Cassandra is a non-relational decentralized database that is designed to handle high incoming data volume with data arriving from many different locations. It has a massively scalable architecture with multiple nodes which share data around the cluster so that a loss of a subset of the nodes does not result in a loss of the data, and has the ability to add nodes without going down. It also has multi-data center replication across multiple geographies and multiple cloud environments. Each node of the cluster is responsible for a different range of data, which causes partitions in data files to differ between nodes. Moreover, even if the files were identical between nodes, a typical Cassandra backup requires copying SSTables in which data are stored in a snapshot from all nodes to backup storage. This creates a problem with deduplication in a DDR deduplication appliance which considers only fingerprints for deduplication across different streams. Similar data being written at the same time from different files may or may not deduplicate because of timing differences.

Another characteristic of Cassandra which can create de-duplication problems is compaction. Compaction is a process for combining SSTables to consolidate data and to remove deleted data (tombstones) after an appropriate timeframe. If a tombstone is removed before it can be replicated, the value may remain on other nodes indefinitely and data that should no longer exist may be returned. The result of compaction is the data will be shifted around to different files, and potentially co-located with different data. The constant reordering of data on any given node due to compaction makes it extremely difficult to deduplicate the data, because the algorithms that identify chunk or segment boundaries are not aware that the data has been rearranged.

It has been found with Cassandra that deduplication processes did not provide compression factors greater than low single digits, either running deduplication between nodes known to have replicated data, or when performing repeated full backups of the same node known to have replicated copies of data, indicating that the deduplication processes had difficulty identifying redundant data in Cassandra files.

It is desirable to provide solutions that address the foregoing and other known problems of deduplicating Cassandra and other similar types of variable data files in which data is constantly changing, being reorganized, and being reordered with other data, and it is to these ends that the present invention is directed.

BRIEF DESCRIPTION OF THE DRAWINGS

FIG. 1 is a diagrammatic view illustrating a Cassandra cluster;

FIG. 2A is a diagrammatic representation of an example of a Cassandra SSTable;

FIG. 2B illustrates the Cassandra SSTable of FIG. 2A following the addition of four rows of data;

FIG. 4 illustrates the SSTable of FIG. 2B following translation and padding of the rows in accordance with an embodiment of the invention.

DESCRIPTION OF PREFERRED EMBODIMENTS

Figure 3:
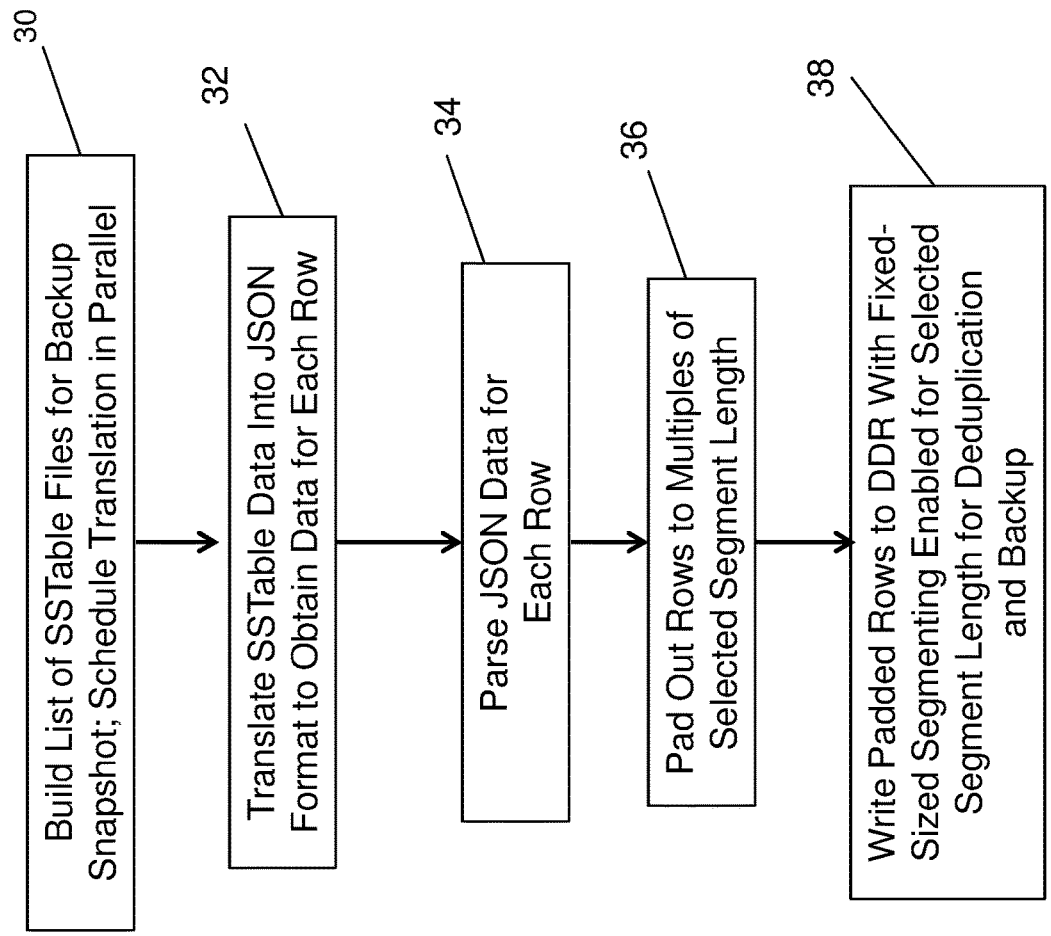
FIG. 3 is a flow chart giving an overview of an SSTable translation process in accordance with the invention.

This invention is particularly useful for improving the deduplication of Cassandra data files, and will be described in that context. However, as will become apparent, this is illustrative of only one utility of the invention, and as will be appreciated from the following, the invention may be used for processing other types of variable data files for deduplication as well as for other processing.

As will be described in more detail below, the invention is based upon discovery that poor deduplication is related to the way that Cassandra stores data in its data files (SSTables). These files are immutable once written, but are periodically merged with other SSTables to reduce the number of files that must be accessed for a particular operation, and to remove data that has been deleted or modified. The data in SSTable files are always sorted by the partition key for the row, so merging these files fundamentally changes the layout a file which destroys the ability to identify duplicates, even within the same node because the hash generated for any particular location is always changing. Furthermore, each node is responsible for a different range of partitions in a Cassandra cluster, so that the data files on each node will be fundamentally different from each other, which also destroys the deduplication between nodes despite the duplicate copies of each row.

Based upon the foregoing and other discoveries, in accordance with the invention it was found that a solution to deduplication problems was to negate the effects of reordering and intermingling of data by enabling the deduplication unit to segment at the Cassandra row level rather than simply agnostically copying the data files. As will be described below, the invention achieves this solution by transforming raw Cassandra data files into a format based upon the size of the deduplication units to transform the SSTables into a format that enables deduplication processing of each individual Cassandra data row, rather than agnostically checking a running checksum. This fixed sized segmenting by the invention enables deduplication problems caused by reordering of the tables on the same node as well as across nodes to be overcome, and affords substantial improvements in deduplication.

To facilitate a better understanding of the invention, a brief description of Cassandra will be given before describing the invention in detail.

Cassandra is a non-relational database that is massively scalable, has low latency, continuous uptime, and global distribution of data across multiple data centers and clouds. Cassandra's cluster architecture is responsible for its ability to perform, scale and afford continuous uptime. As shown in FIG. 1, a Cassandra cluster has a masterless "ring" architecture comprising a network 10 interconnecting a plurality of nodes 12. All nodes have identical roles; there is no master node, and all nodes communicate using a distributed scalable protocol. Each node comprises (not shown in the figure) a computer system comprising processors/servers, memory, I/O, storage for executable instructions, applications and data, and in an associated cluster has a data store, a deduplicator appliance (such as a Data Domain Restorer ("DDR") from DataDomain) and a backup system.

Cassandra data files are referred to as SSTables and are maintained per table in each keyspace. Data is logically organized in rows and stored as row-value pairs (each pair has a timestamp), and the data are sorted by rows on a partition key within the SSTable. The tables are immutable once written to disk, so changes or deletions to existing data are written as new row-value pairs with new timestamps so that the new values will take precedent. Cassandra employs a compaction process for periodically removing old copies of data and for merging and consolidating SSTables to limit the number of tables that must be accessed to produce the data requested.

FIG. 2A is a diagrammatic view illustrating an example of an SSTable 20. As shown, data are stored in rows, with each row being identified by a row key value. Each row has a starting offset and a length in bytes. The lengths of the rows vary because they contain different sizes of data. For instance, in Cassandra when data in a row changes, the row is not necessarily rewritten with the changed data. Rather, a new row will be written with only the changed data, a new key and a new timestamp. In the example shown, the table 20 has nine rows of data totaling 8 KB; and this data may correspond to data stored in a first backup file. The first backup will anchor this file in a repeatable way such that if it was written again unchanged, it would be completely deduplicated. FIG. 2B illustrates a second backup table 24 comprising the table 20 of FIG. 2A after inserting four rows of data, each having a length of 256 bytes and respectively identified by row keys 75, 789, 2107, and 4099 (shown in bold). For purposes of illustration, each added row may have a size of 256 bytes, although the rows also may be of other sizes. Since Cassandra files are always sorted by the row key, the table data will be reorganized and some rows will be moved around to new locations (rows). For example, as shown in FIG. 2B a new data row 75 will be inserted between rows 17 and 100; new row 789 will be inserted between rows 412 and 1021; new row 2107 will be inserted between rows 2004 and 2700; and new row 4099 will be inserted between row 3209 and row 8000. Table 24 with the inserted new rows of data will now have 13 rows, and the starting offsets of the rows will be adjusted according to the lengths of the inserted new rows, as shown. When the file (table 24) is segmented for a second backup, it is likely that little if any duplicate data will be found relative to the data of table 20, despite adding only 1 KB to the original 8 KB file, because of the intermingling of the new data with the old data.

Conventional deduplication algorithms read a file and decide how to divide (segment) the file into chunks for deduplication and backup. The segmentation process is agnostic to the layout of the file. It simply processes a stream of bytes and when some condition is met it calculates a fingerprint (hash) of the data for deduplication purposes. With a DataDomain DDR appliance, the size of deduplication units, referred to herein as chunks or segments, may be as small as 4 KB, but the row size may vary depending upon the actual data. When the order of data is changed, as when a file is modified and reorganized as shown in FIG. 2B, the segmentation algorithm will not necessarily pick up the same row boundaries in the modified file for the next backup. Thus, it will produce different fingerprints and will not deduplicate, despite the fact that except for the added four rows the data is the same.

The invention addresses this problem by transforming each row of data in an SSTable into a format which can be consistently segmented into predetermined fixed-sized segments for deduplication and backup processing. FIG. 3 gives an overview of an embodiment of a process in accordance with the invention for accomplishing this. Additional details of the process of FIG. 3 will be given in connection with FIG. 5.

The transformation process is preferably performed at each Cassandra node. Referring to FIG. 3, the process begins at 30 by selecting and listing SSTable files for backup snapshots, and by scheduling the files for translation. At 32, the SSTable data is translated into a format, such as JSON format, for example, to obtain individual rows of data having row lengths that can be contained within a multiple of the selected segment size. Preferably, the table rows are translated in parallel, as will be described. Next, 34, the JSON formatted data is parsed to obtain data for each row, and at 36 each row is padded out with a predictable pattern, such as all zeros, so that the row has a row length corresponding to the selected segment size. This ensures that the row boundaries are on a multiple of the selected fixed segment size. In a preferred embodiment, the selected segment size for duplication is a length of 4 KB. Any given row of raw data may have a size corresponding to multiple segments. For example, a row having a length of 17 KB would be transformed into five 4 KB segments. A segment size of 4 KB is a convenient size for deduplication, although other segment lengths such as 8 KB, for example, may also be used. Finally, at 38, the translated JSON rows are padded to have a length that is a multiple of the selected segment length, and the padded rows are be written to a DDR data store, which may be in a separate cluster, for deduplication and backup. The DDR will be enabled to perform fixed-sized segmenting for the selected segment length, e.g., 4 KB. This will insure a consistent row segment size for deduplication.

FIG. 4 is a diagrammatic view of the SSTable 24 of FIG. 2B following transformation of the table row data in accordance with the process of FIG. 3 using a segment size of 4 KB to form a new table 40. (FIG. 4 shows the transformed table 40 split into two parts for clarity of illustration in the figure.) Each of the thirteen rows of table 24 is shown in table 40, and the same rows in the two tables are identified by the same row key values. The four new rows of data added to table 24 identified by the row key values 75, 789, 2107 and 4099, in bold in table 24, are again shown in bold in table 40. However, as illustrated in FIG. 4, each row of data of SSTable 40 has been padded with a sufficient number of bytes so that the row begins and ends on a boundary that is a multiple of the selected segment value (4 KB). For example, the first row of data identified by key 17 in tables 24 and 40 has a length of 1024 bytes (1 KB). However, following translation and padding of row 17 with 3072 bytes, as illustrated in FIG. 4, the boundaries of row 17 in table 40 are on multiples of the selected segment size of 4 KB, i.e., 0 and 4096 bytes. Thus, row 17 (as padded) has a length equal to the segment size, and the next row (key value 75) following row 17 starts at an offset of 4096 bytes (4 KB), a multiple of the selected segment size. Row 75 has a length of 256 bytes, and is padded with 3840 bytes, as indicated, so that the boundaries of row 75 are at 4096 and 8192, multiples of the 4 KB segment size. This pattern is continued for the remaining rows of the table so that all row boundaries have offsets located at multiples of the segment size.

As noted above, the padding may comprise any fixed bit pattern, such as all zeros, having the desired length to set the row boundaries on multiples of the segment size. In contrast, as shown in FIG. 2B, prior to transformation of the SSTable 24 to form table 40 (FIG. 4) the length of row 17 was 1024 bytes and the ending offset boundary of row 17 was at 1024 bytes (1 KB); and the boundaries of the other rows in table 24 were set by the length of the rows. Following translation and padding, the boundaries of all of the other rows in the translated SSTable 40 are on multiples of the selected segment size, 4 KB, as shown in FIG. 4. Accordingly, when data from table 40 is written to a backup store for segmenting and deduplication, because deduplication segmentation always starts on a row boundary, a given row that is unchanged will always produce the same fingerprint and can be deduplicated no matter where it moves in the file.

The SSTable 40 of FIG. 4 indicates a fingerprint, e.g., a hash, for each row of data of the table which may be determined by well known means. During deduplication, the fingerprints of new data are compared to the fingerprints of previously backed up or stored data to identify duplicate (redundant) data. Deduplication may eliminate duplicate data or may replace the duplicate data by a reference or pointer to the original data.

Figure 5:
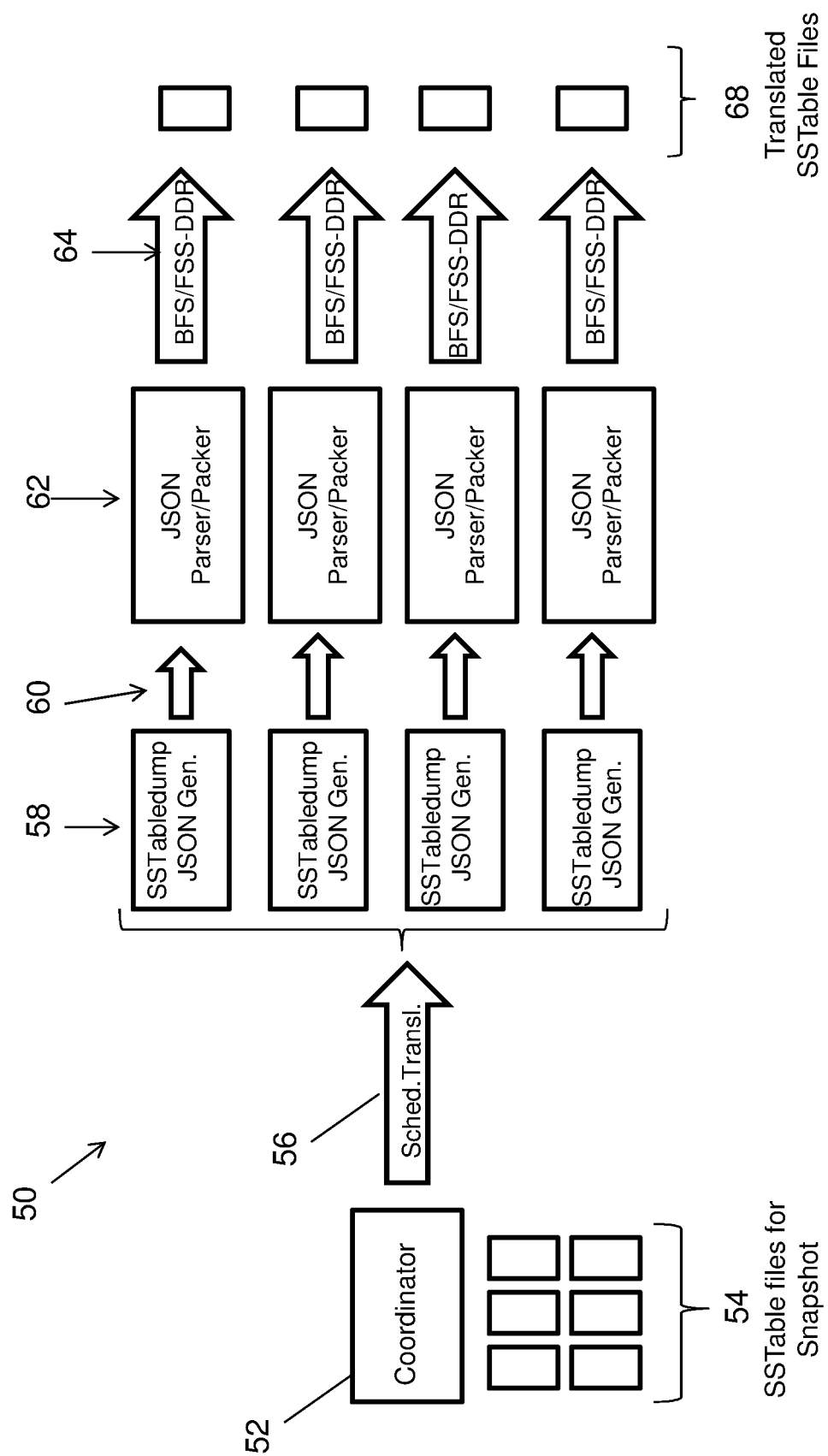
FIG. 5 is diagrammatic view illustrating a method in accordance with the invention on a node of the Cassandra cluster of FIG. 1.

FIG. 5 is a diagrammatic view illustrating components of a node 50 of a Cassandra cluster that perform an SSTable data transformation process in accordance with the invention. As indicated previously, the process is preferably performed at each Cassandra cluster node. Each node may have a memory or other storage storing executable instructions that control a processor on the node to perform the operations described herein. As previously described, each node needs to translate a raw SSTable file into a format that can be processed at the row level. This requires reading and translating SSTable files as quickly as possible, preferably in parallel. It is also preferable to avoid storage of intermediate copies of translated JSON files as this represents a significant storage overhead; and as previously described, the translation needs to ensure the translated files are segmented on row boundaries for proper deduplication.

As shown in FIG. 5, a cluster node 50 may comprise a coordinator 52 comprising a script running on a processor of the node that generates a list of SSTable files 54 for a snapshot, up to a configurable limit of files, and schedules files at 56 for translation in parallel. The next step in a process is responsible for converting particular SSTable files into a predetermined format that outputs row data. This is preferably done in parallel. A format such as JSON format is preferred, although other formats may be employed. For this conversion, it is preferable to use parallel SSTableDump processes 58 of Cassandra which output JSON format in a stream, and pipe the outputs at 60 to corresponding JSON parser/packer processes 62. The parser/packer processes 62 may comprise a Python script that utilizes two Python classes which parse each row, pad the parsed rows to a specified length determined by the selected segment size, and write the padded rows to a data store of a DDR having fixed-sized segmenting (FSS) enabled. This may be accomplished by backing up the translated and padded SSTable files through DataDomain's BoostFS application 64 modified to support 4 KB and 8 KB FSS so that when the translated rows are written they will be segmented on the individual rows. The process writes the translated SSTable files 68 to a data store of the DDR for de-duplication and backup.

The DDR that performs deduplication and backup receives translated files from all the nodes in a Cassandra cluster over a network interconnect. The DDR may be in a separate network or datacenter from the Cassandra cluster, and may receive files from other clusters connected to the DDR via the network. In order to reduce the amount of network traffic transferred between a Cassandra cluster and a DDR, in an embodiment, the invention may generate and transmit only the fingerprints of transformed SSTable rows to the DDR or another processor for comparison with stored fingerprints of previously backed up data. Upon finding matching fingerprints indicating duplicated data, the DDR or other processor may inform the Cassandra cluster that a particular row is a duplicate and supply a reference or pointer to the original data so that the new data file is a duplicate and need not be transmitted over the network, thereby reducing network traffic and resource requirements. Additionally, any data that is sent over the network may be compressed to further reduce network traffic. Moreover, by storing translated JSON files, high compression rates are obtained since text data is highly compressible, more so than binary Cassandra data.

A seeming downside of the invention is the apparent expansion in the amount of data from a native format to the transformed format resulting from the JSON conversion and the padding of the rows to a fixed segment size. Although tests run with the invention indicated approximately a 7.5 times expansion in data size using the transformation process of the invention, significant improvements in compression due to deduplication and reduced backup storage more than offset the disadvantage of data size expansion. Additionally, using fixed-sized segmenting also increased the metadata overhead on the DDR due to the need for an increased number of segments. Again, this increase in overhead was offset by improved deduplication and the reduction in backup storage requirements.

From the foregoing, it can be appreciated that converting variable data in SSTable rows to fixed-sized row segments padded to correspond to deduplication segment sizes can result in substantial increases in the ability to identify duplicated data in a variable data format such as Cassandra, and afford a corresponding increase in deduplication performance. It will also be appreciated from the foregoing that the invention has applicability to deduplication and backup of other types of data files other than Cassandra files that exhibit a varying data format due to data changes and intermingling of data.

While the foregoing has been with respect to particular embodiments of the invention it will be appreciated by those skilled in the art the changes to these embodiments may be made without departing from the principles and the spirit of the invention, the scope of which is defined by the appended claims.

The invention claimed is:

1. A method of improving deduplication and backup of data files that store changing data in tables as a plurality of rows of variable length data that are reordered and merged with rows as data changes, comprising:
   selecting a fixed segment size of data as a data unit for deduplication;
   translating each row of data in a selected table into a format that enables access to the data in each said row in said selected table;
   parsing the data in said translated rows of said selected table to provide row lengths that are sized to fit within multiples of said fixed segment size;
   adjusting the row length of each parsed row in said selected table to have a length that corresponds to said fixed segment size by padding each parsed row with a predetermined predictable pattern of bytes to produce a transformed table having rows of the same size; and
   deduplicating individual rows of data in said transformed table to identify data that is a duplicate of previously stored data.

2. The method of claim 1, wherein each row of data has a unique key value, and data rows are ordered within said selected table by said key values.

3. The method of claim 1, wherein said translating comprises translating the data in the selected table into a format such that the data in each row is contained within a length corresponding to said fixed segment size.

4. The method of claim 1, wherein said adjusting comprises padding the length of each row of said selected table such that the boundaries of each such row are on locations in said selected table corresponding to multiples of said selected segment size.

5. The method of claim 1, wherein said tables are Cassandra tables and wherein said translating, said parsing and said adjusting are performed in parallel on a plurality of said Cassandra tables.

6. The method of claim 5, wherein the Cassandra tables are located on one or more nodes of a Cassandra cluster of nodes, and said method comprises transferring said transformed table over a network to another cluster for said deduplicating.

7. The method of claim 6 further comprising generating a fingerprint for each row of data, and transferring said fingerprints over said network for comparison with stored fingerprints of previous data to identify a row of duplicate data before transferring said row of duplicate data over said network.

8. Non-transitory computer readable storage medium storing executable instructions for controlling a computer to perform a method of deduplication and backup of data files that store changing data in tables as a plurality of rows of variable length data that are reordered and merged with rows as data changes, comprising:
   selecting a fixed segment size of data as a data unit for deduplication;
   translating of each row of data in a selected table into a format that enables access to the data in each row in said selected table;
   parsing the data in said translated rows of said selected table to provide row lengths that are sized to fit within multiples of said fixed segment size;
   adjusting the row length of each parsed row in said selected table to have a length that corresponds to said fixed segment size by padding each parsed row with a predetermined predictable pattern of bytes to produce a transformed table having rows of data of the same size; and
   deduplicating individual rows of data in said transformed table to identify data that is a duplicate of previously stored data.

9. The non-transitory computer readable storage medium of claim 8, wherein each row of data has a unique key value, and data rows are ordered within said selected table by said key values.

10. The non-transitory computer readable storage medium of claim 8, wherein said translating comprises translating the data in the selected table into a format such that the data in each row is contained within a length corresponding to said fixed segment size.

11. The non-transitory computer readable storage medium of claim 8, wherein said adjusting comprises padding the length of each row of said selected table such that the boundaries of each such row are on locations in said selected table corresponding to multiples of said selected segment size.

12. The non-transitory computer readable storage medium of claim 8, wherein said tables are Cassandra tables and wherein said translating, said parsing and said adjusting are performed in parallel on a plurality of said Cassandra tables.

13. The non-transitory computer readable storage medium of claim 12, wherein the Cassandra tables are located on one or more nodes of a Cassandra cluster of nodes, and said method comprises transferring said transformed table over a network to another cluster for said deduplicating.

14. The non-transitory computer readable storage medium of claim 13, further comprising generating a fingerprint for each row of data, and transferring said fingerprints over said network for comparison with stored fingerprints of previous data to identify a row of duplicate data before transferring said row of duplicate data over said network.

* * * * *